United States Patent
Wolf et al.

[15] 3,656,933

[45] Apr. 18, 1972

[54] ROASTING MATERIALS CONTAINING ROASTABLE SULFUR WITH ARSENIC AND/OR ANTIMONY

[72] Inventors: Herbert Wolf, Bad Duerkheim; Wilhelm Goesele, Ludwigshafen, Germany

[73] Assignee: Badische Anilin- & Soda-Fabrik Aktiengesellschaft, Ludwigshafen am Rhine, Germany

[22] Filed: June 3, 1969

[21] Appl. No.: 830,129

[30] Foreign Application Priority Data

June 12, 1968 Germany.....................P 17 67 753.1

[52] U.S. Cl..........................................................75/9
[51] Int. Cl...................................................C22b 1/10
[58] Field of Search.............................................75/9

[56] References Cited

UNITED STATES PATENTS

| | | |
|---|---|---|
| 2,889,203 | 6/1959 | Pfannmueller et al..................75/9 X |
| 2,993,778 | 7/1961 | Johannsen et al.........................75/9 |
| 3,198,602 | 8/1965 | Wittmann..............................75/9 X |

FOREIGN PATENTS OR APPLICATIONS

| | | | |
|---|---|---|---|
| 255,009 | 5/1963 | Australia...................................75/9 |

Primary Examiner—Allen B. Curtis
Attorney—Johnston, Root, O'Keeffe, Keil, Thompson & Shurtleff

[57] ABSTRACT

A fluidized-bed method of roasting sulfidic materials containing arsenic and/or antimony with a gas containing oxygen with separate supply of the gas containing oxygen for the preroasting in a first stage and for the afterroasting in the second stage and with separate withdrawal of the roaster gas from the preroasting stage and from the afterroasting stage. The dusty portion of the roasted intermediate product from the first stage is introduced periodically into the fluidized bed of the second stage and, in timed relationship with this periodic introduction of the roasted intermediate product, air is periodically introduced into the gas space above the fluidized bed in the second layer in such an amount that it is adequate for complete roasting of the dusty roasted intermediate products suspended in this gas space.

2 Claims, No Drawings

ROASTING MATERIALS CONTAINING ROASTABLE SULFUR WITH ARSENIC AND/OR ANTIMONY

It is known that in the method for roasting materials containing roastable sulfur in addition to arsenic and/or antimony in two successive stages the material to be roasted is only partially roasted in a first stage with an excessive amount of oxygen-containing gas so that arsenic and antimony are volatilized, and the roasting of the intermediate product from the first stage is completed in a second stage. The oxygen-containing gas for the preroasting in the first stage is supplied separately from that for the final roasting in the second stage and the roaster gas of the first stage is withdrawn separately from that of the second stage. In roasting pyrites by this method, the roasting in the first stage is carried to a point where the intermediate roasted product consists mainly of ferrous sulfide or a mixture of ferrous sulfide and ferrosoferric oxide having at least 3 percent of sulfur in sulfidic combination. Some of the roasted intermediate product formed in the first stage is withdrawn from the fluidized bed in this stage and supplied to the fluidized bed in the second stage, while the remainder of the intermediate product is discharged with the roaster gas from the first stage, separated in a downstream hot cyclone and then supplied to the fluidized bed in the second stage. Depending on the quality of the material being roasted, its particle spectrum and the gas velocity in the preroasting stage, the ratio of the amount of roasted intermediate product discharged from the cyclone and from the fluidized bed may fluctuate. In the case of iron pyrites having the usual particle size spectrum of from 0 to 6 mm the amount of roasted intermediate product withdrawn from the fluidized bed is, for example, 50 percent or more of the total amount and consists of the coarser particles, whereas mainly the dusty portion of the roasted intermediate product is separated in the cyclone.

According to one of our own proposals which has not yet been published the roasted intermediate product is periodically supplied to the fluidized bed in the second stage. Such a periodic supply of the roasted intermediate product to the second roasting stage makes it possible to accumulate roasted intermediate product on its way from the fluidized bed of the first stage to that of the second stage, which in the event of pressure fluctuations prevents roaster gas containing arsenic passing from the first stage into the second stage and conversely prevents roaster gas containing oxygen passing from the second stage into the first stage. In the former case the arsenic contained in the gas of the first stage would react with the ferric oxide present in the fluidized bed in the second stage with the formation of ferric arsenate, which would result in an increase in the arsenic content in the roasted ore. In the latter case the excess oxygen of the roaster gas formed in the second stage would cause undesirable additional oxidation of the roasted intermediate product in the first stage or in the cyclone downstream of this stage, which could result in the formation of slag deposits, particularly in the cyclone. Since moreover dust containing $Fe_2O_3$ is always entrained by the roaster gas of the second stage, the passage of this gas into the first stage would cause fixation of arsenic which would also raise the arsenic content of the whole of the roasted ore.

Experience has shown that the above-described accumulation of the roasted intermediate product in the case of periodic introduction of the same into the fluidized bed of the second stage results in some shortcomings in the operation or the furnace. In this stage an excess of oxygen or gas containing oxygen is used in order to oxidize the residual sulfur content of the material being roasted as completely as possible. This excess of oxygen should on the other hand be kept as small as possible so that the roaster gas will not be unnecessarily diluted and so that the amount of gas to be purified can be kept small. The result is that a deficiency of oxygen can occur temporarily in the fluidized bed of the second stage during the periodic feed of roasted intermediate product. The coarser portion, i.e., the discharge from the fluidized bed of the first stage, is hardly affected because it is mainly burned in the fluidized bed of the second stage in which its residence time is an hour or more so that an adequate amount of oxygen-containing gas is available for roasting. Conditions are quite different in the case of that portion of the roasted intermediate product which is fed from the cyclone of the first stage to the fluidized bed of the second stage. This dusty material is only partially retained in the fluidized bed of this stage, while a considerable proportion is burnt, mainly in the free furnace space above the fluidized bed, and entrained by the roaster gas. The time available for the oxidation of this portion and consequently the amount of oxygen available are considerably less, which results in incomplete roasting.

We have found that these disadvantages can be avoided by introducing air periodically into the gas space above the fluidized bed of the second stage an amount which is adequate for complete roasting of the dusty roasted intermediate product suspended in this gas space, said periodic introduction being effected in timed relationship to periodic introduction of the dusty roasted intermediate product from the first stage into the fluidized bed of the second stage. The length of time during which air is introduced should be at least equal to the length of time during which the dusty roasted intermediate product is introduced, but may exceed the latter.

It is known that in single-stage fluidized-bed roasting secondary air can be injected continuously into the gas space above the fluidized bed. In this single-stage method in which there is always a sufficiently high excess of oxygen present in the gas space above the fluidized bed, introduction of secondary air is carried out mainly for the purpose of producing turbulence in the gas space to increase the rate of roasting. In contrast to this, in the periodic supply of the dusty roasted intermediate product from the cyclone of the first stage of a two-stage roasting unit to the fluidized bed of the second stage it must be expected—in spite of continuous supply of secondary air into the space above this fluidized bed—that during the period when dust is being introduced an insufficient amount of air is available for complete roasting of the same, since the amount of air supplied has to be limited to avoid undesirable dilution of the roaster gas.

The invention is illustrated by the following example.

EXAMPLE

The preroasting furnace of a fluidized-bed roasting plant consisting of two stages is supplied hourly with 6.25 metric tons of pyrites containing 47.9% of S, 41.42% of Fe, 1.215% of Cu, 0.89% of Pb, 2.35% of Zn, 0.45% of As, and 5.75% of residue.

A roasted intermediate product consisting of 27.5% of S, 60.6% of Fe, 1.63% of Cu, 0.6% of Pb, 3.15% of Zn and 7.1% of residue is obtained in the preroasting furnace.

2.21 metric tons of this roasted intermediate product per hour is supplied periodically from the fluidized bed in the preroasting furnace and 2.21 metric tons per hour from the cyclone downstream of the preroasting furnace to the afterroasting furnace. Discharge from the fluidized bed in the preroasting furnace is effected forty times each hour, the slide being opened for 2.2 seconds in each case. Discharge from the cyclone is also effected 40 times each hour, the slide being open for 3 seconds on each occasion.

The afterroasting furnace, which has a grate area of 3.8 m² and a height of 10 meters above the grate and which (at a height of the fluidized bed of 600 mm) has a free combustion space above the fluidized bed of about 32 m³, is loaded with 8500 m³ (STP) of air per hour. The residence time of the material in the fluidized bed is about 1 hour. With a feed of 2.21 metric tons of roasted intermediate product per hour, 1069 kg of oxygen is required for complete roasting. The supply of 8500 m³ (STP) per hour of air (which is necessary for the maintenance of a stable fluidized bed) is equivalent to the supply of 2550 kg of oxygen. There is therefore available for roasting the intermediate product from the fluidized bed of the preroasting stage in the fluidized bed of the afterroasting stage 2.4 times the amount of oxygen theoretically required. It can be calculated that under these conditions and having regard to the volumetric contraction there is formed 8180 m³ of roaster gas containing 5.07% of $So_2$ and 12.66% of oxygen which is available for burning the 2.21 metric tons of roasted intermediate product coming from the cyclone. Since however the roasted intermediate product from the cyclone is introduced (i.e., in the course of 1 hour) only 40 times for 3 seconds each (i.e., during a total of 2 minutes), the amount of oxygen available during the time of introduction into the gas space of the afterroasting furnace is far from adequate for complete roasting of the whole product. The exact residence time of the dusty portion of the cyclone discharge in the afterroasting furnace is not known so that it is not possible to calculate exactly the amount of oxygen available for complete roasting of this product. In fact it has been found that the material withdrawn from the fluidized bed of the afterroasting furnace has a residual sulfur content of only 1.5% or less, whereas the roasted ore which is discharged from the waste heat boiler and the dry-type electric gas purification unit arranged downstream of the afterroasting furnace has a sulfide sulfur content of 4 percent or more. Continuous supply of additional air, for example in an amount of 1600 m³ (STP) per hour, into the gas space above the fluidized bed in the afterroasting furnace does not produce any change. If the supply of this additional amount of air is carried out periodically substantially in rhythm with the opening times of the slide which releases the roasted intermediate product from the cyclone, the sulfide sulfur content of the roasted ore discharged from the waste heat boiler and the gas purification unit undergoes a considerable decrease and sulfide sulfur values are found which are even less than those of the material withdrawn from the fluidized bed. This periodic supply may be carried out for example by arranging for the valve for the supply of additional air to open for 12 seconds at the beginning of the opening time of the slide and by injecting the air through several (for example six) inlet pipes distributed over the furnace shell.

We claim:

1. A process for the production of gas containing sulfur dioxide by roasting sulfidic material containing arsenic and/or antimony with oxygen-containing gas in stages in fluidized beds with separate supply of oxygen-containing gas for preroasting in a first stage and for afterroasting in a second stage and with separate withdrawal of the roaster gas from the preroasting stage and from the afterroasting stage, which comprises separating in a cyclone separator dusty roasted intermediate product produced in the first stage, periodically introducing the separated dusty roasted intermediate product into the fluidized bed of the second stage in spaced, short intervals of a few seconds each, and introducing air into the gas space above the fluidized bed of the second stage in an amount which is adequate for complete roasting of the dusty roasted intermediate product in this gas space simultaneously with said periodic introduction of the separated dusty roasted intermediate product from the first stage into the fluidized bed of the second stage in spaced, short intervals of a few seconds each and for a length of time which is at least equal to the length of time during which said dusty roasted intermediate product is introduced into said gas space.

2. A process as claimed in claim 1 wherein said sulfidic material is a pyrite of arsenic and/or antimony.

* * * * *